United States Patent Office 2,744,101
Patented May 1, 1956

2,744,101

9(10)-DEHYDRO-DEHYDROABIETIC ACID DERIVATIVES

Lee A. Subluskey, Wilmington, Del., assignor to Hercules Powder Company, Wilmington, Del., a corporation of Delaware No Drawing. Application December 13, 1952, Serial No. 325,893

8 Claims. (Cl. 260—99)

This invention relates to new phenanthrenecarboxylic acids and alcohols and, more particularly, to derivatives of dehydroabietic acid containing a double bond in the 9(10)-position.

In accordance with this invention, it has been found that a double bond may be introduced into the 9(10)-position of the dehydroabietic acid nucleus to produce a new series of compounds which, for convenience, may be considered as dehydro-dehydroabietic acid and derivatives thereof. These compounds may also be named as derivatives of 1,2,3,4,4a,10a-hexahydro-7-isopropyl-1,4a-dimethyl-1-phenanthrenecarboxylic acid and the correspond alcohol. Thus, an entirely new functional group has been introduced into a resin acid, and from this intermediate a whole new class of compounds may be produced. The new dehydro-dehydroabietic acid and derivatives thereof are believed to have the following structural formula:

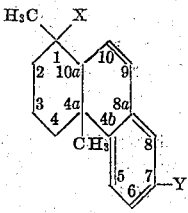

where X is COOR, CH₂OR, or CH₂O-acyl, where R is hydrogen, alkyl, cycloalkyl, hydroxyalkyl, or aralkyl, and Y is an isopropyl, isopropenyl, hydroxy, or acetyl radical.

The following examples will illustrate the preparation of this new dehydro-dehydroabietic acid and derivatives thereof in accordance with this invention. All parts are by weight unless otherwise indicated.

EXAMPLE 1

*Dehydro-dehydroabietic acid and methyl ester thereof*

One part of methyl 9β-hydroxydehydroabietate and one part of p-toluenesulfonyl chloride were dissolved in 4 parts of pyridine and the reaction mixture was held at −5° C. for 16 hours. The excess pyridine was then removed under reduced pressure and 50 parts of water was added. The precipitate that formed was collected and washed with water. It was recrystallized from aqueous methanol to a constant melting point of 193°–193.8° C. The carbon, hydrogen, and nitrogen analyses were in agreement with those for the methyl ester of dehydroabietic acid-9α-pyridinium p-toluenesulfonate. Sixteen parts of the above methyl 9α-ester of dehydroabietic acid-pyridinium p-toluenesulfonate was distilled at a pressure of 0.2 to 0.3 mm. and pot temperature of 200°–230° C. The clear distillate so obtained was dissolved in hexane and placed on a hexane-slurry-packed alumina chromatographic column. On evaporation of the solvent from the hexane eluent, there yielded as an oil the methyl ester of dehydrodehydroabietic acid, which may also be named the methyl ester of 1,2,3,4,4a,10a-hexahydro-7-isopropyl-1,4a-dimethyl-1-phenanthrenecarboxylic acid.

Four and one-half parts of the above oil was refluxed in 100 parts of ethanol containing 0.75 part of sodium hydroxide for 18 hours. The reaction mixture was then neutralized by adding concentrated hydrochloric acid, and the alcohol solvent was removed. The residue so obtained was dissolved in ether and the acidic and neutral materials were separated by extraction with a 2% aqueous sodium hydroxide solution. The acidic material was recrystallized from methanol containing a small amount of water to a constant melting point of 157.5°–158° C. The carbon and hydrogen analysis agreed with the theoretical values for 9(10)-dehydro-dehydroabietic acid, the systematic name for which is 1,2,3,4,4a,10a-hexahydro-7-isopropyl-1,4a-dimethyl-1-phenanthrenecarboxylic acid. It had an ultraviolet spectrum which was in agreement for that of a compound containing a double bond in conjugation with the benzene ring.

Further proof for the double bond was obtained by hydrogenation of the acid in ethanol using a palladium-on-carbon catalyst, whereupon 0.74% hydrogen was absorbed, theory for one aliphatic double bond being 0.67%. The hydrogenated material was recrystallized from methanol and water to a constant melting point of 160°–162° C. Analysis of it by ultraviolet spectral and X-ray diffraction methods indicated that it was pure dehydroabietic acid.

EXAMPLE 2

*Methyl 9(10)-dehydro-dehydroabietate*

Fifty parts of methyl dehydroabietate and 30 parts of N-bromosuccinimide were mixed with 500 parts of carbon tetrachloride which had previously been cooled to 15° C. The reaction mixture was agitated while bubbling a stream of dry nitrogen through it and exposed to ultraviolet light. These conditions were maintained for 1 hour, at which time the temperature of the reaction mixture was not allowed to rise above 25° C. At the end of this time, the insoluble succinimide was removed by filtration.

The solution of the bromination product in carbon tetrachloride, which was the filtrate obtained above, was then poured into a solution of 50 parts of fused potassium acetate in 750 parts of glacial acetic acid. This acetolysis mixture was agitated under reduced pressure and heated at 80° C. until the carbon tetrachloride and acetic acid solvent had been removed by evaporation. The residue so obtained was dissolved in 700 parts of ether and the ethereal solution was washed with water, then with a saturated sodium carbonate solution, and finally with water again, and dried. On removal of the ether, there was obtained 51.2 parts of a crystalline solid. The ultraviolet absorption of this solid indicated the presence of a double bond in the 14(15)-position. Recrystallization of the solid from hexane reduced but did not completely remove the unsaturation. It was, therefore, hydrogenated in ethyl acetate with a palladium-on-carbon catalyst until the 14(15)-unsaturation was removed.

The mixture of methyl 9α-acetoxydehydroabietate and methyl 9β-acetoxydehydroabietate obtained above was refluxed in collidine for 40 hours, after which the reaction mixture was dissolved in ether, washed with dilute hydrochloric acid, dried, and evaporated to dryness. Crystallization of this product yielded a pure methyl 9α-acetoxydehydroabietate. Evaporation of the mother liquors from the latter crystallization gave an oil which exhibited the characteristic ultraviolet absorption of methyl 9(10)-dehydro-dehydroabietate, indicating that some of the methyl 9-acetoxydehydroabietates had lost acetic acid to yield the 9(10)-dehydro-dehydroabietate.

EXAMPLE 3

*Methyl 9(10)-dehydro-dehydroabietate*

A crude mixture of the methyl 9-bromodehydroabietates obtained from a reaction between 20 parts of methyl dehydroabietate and 12 parts of N-bromosuccinimide was dissolved in 300 parts of glacial acetic acid and then was treated with 50 parts of potassium acetate. This reaction mixture was allowed to stand at room temperature for 72 hours, after which it was poured into ice water and neutralized with sodium bicarbonate. The ice water mixture was then extracted three times with ether and the ether extracts were combined and dried. After removing the ether, the residue was dissolved in hexane and placed on an alumina chromatographic column. Continued washing of the column with hexane yielded 9.0 parts of an oil which readily absorbed bromine in carbon tetrachloride solution and which absorbed hydrogen over a palladium catalyst in the amount of 66 mg. of hydrogen per gram of sample. The ultraviolet spectrum of this oil was characteristic for methyl 9(10)-dehydro-dehydroabietate. Elution of the column with benzene and mixtures of benzene and methylene chloride yielded 6.5 parts of a crystalline material which proved to be a mixture of methyl 9α-acetoxydehydroabietate and methyl 9α-hydroxydehydroabietate (the latter resulting from hydrolysis of methyl 9α-acetoxydehydroabietate on the alumina column).

EXAMPLE 4

Methyl 9(10)-dehydro-dehydroabietate

Thirty-one parts of methyl dehydroabietate was treated with 18 parts of N-bromosuccinimide in boiling chloroform with 0.05 part of benzoyl peroxide for 23 minutes. The insoluble succinimide was then removed by filtration and the filtrate was mixed with 45 parts of dimethyl aniline and 50 parts of 2,4,6-collidine. The reaction mixture was heated to about 100° C. and held at that temperature for 50 hours, the insoluble salts resulting from the dehydrohalogenation being removed by filtration at intervals during the heating treatment. The dark brown reaction mixture so obtained was dissolved in ether, washed with 5% aqueous hydrochloric acid, then with water, and dried. After removing the ether, the residue was dissolved in hexane and placed on an alumina chromatographic column. Elution of the column with hexane gave, after removal of the hexane eluent, 15.5 parts of an oil which readily absorbed bromine in a carbon tetrachloride solution, and which exhibited an ultraviolet absorption spectrum characteristic of methyl 9(10)-dehydro-dehydroabietate.

EXAMPLE 5

9(10)-dehydro-dehydroabietic acid and methyl ester

Nineteen parts of methyl 9β-hydroxydehydroabietate was heated with 15 parts of p-chlorobenzoyl chloride and 50 parts of pyridine to 60° C. for 1.5 hours. The pyridine solvent was then removed and the residue was treated with water. The resulting water mixture was extracted with ether and the ethereal extract was washed consecutively with a 20% hydrochloric acid solution, saturated sodium bicarbonate, water and then was dried. Removal of the ether yielded 33 parts of crystalline methyl 9β-(p-chlorobenzoxy)dehydroabietate, which on recrystallization from ethanol had a melting point of 130°–131° C.

Twenty-six parts of this methyl 9β-(p-chlorobenzoxy)-dehydroabietate was refluxed with 100 parts of 2,4,6-collidine for 60 hours. The collidine was removed and the residue was shaken with a mixture of ether and water. The ether phase was washed with water, dilute hydrochloric acid, water, dilute alkali, again with water and dried. The fluid oil remaining after removal of the ether was distilled under reduced pressure whereby 14.4 parts of methyl 9(10)-dehydro-dehydroabietate having a boiling point of 171°–172° C. at 1.0 mm. pressure was obtained. Upon standing, this cut crystallized. The crystals had a melting point of 38.5°–39° C., exhibited an ultraviolet spectrum characteristic of a dehydro-dehydroabietate, and the carbon and hydrogen analysis and hydrogen absorption were in agreement with the calculated values. Saponification of this ester gave 9(10)-dehydro-dehydroabietic acid having a melting point of 157.5°–158° C.

EXAMPLE 6

9(10)-dehydro-dehydroabietyl alcohol and ester thereof

A mixture of 25 parts of methyl 9-oxodehydroabietate and 50 parts of ether was added to an agitated mixture of 7 parts of lithium aluminum hydride and 200 parts of ether. Agitation of the reaction mixture was continued for 24 hours at a temperature of 20°–25° C. The excess lithium aluminum hydride was then destroyed by the addition of 200 parts of water, after which 100 parts of an aqueous 20% sulfuric acid solution was added and the agitation was continued for 4 hours. The ether phase was then separated, washed with water, then with a saturated sodium bicarbonate solution, again with water, and finally was dried. Evaporation of the ether yielded a white, crystalline solid. On recrystallization from methanol, the 9β-hydroxydehydroabietyl alcohol had a melting point of 156.5°–157.5° C.

Seventeen parts of the above diol was dissolved in 100 parts of pyridine and then 20 parts of benzoyl chloride was added. The reaction mixture was then heated on a steam bath for 1 hour, at the end of which time 300 parts of water was added and the resulting mixture was extracted with ether. The ether extract was washed with a 10% aqueous hydrochloric acid solution, then with a saturated sodium bicarbonate solution and water, and finally was dried over sodium sulfate and evaporated. The oil so obtained was crystallized from ethanol to yield 22.7 parts (79% of theory) of the product, melting at 128°–129° C. Several recrystallizations from ethanol raised this melting point to 129.5°–130.5° C. On analysis the carbon and hydrogen were found to agree with the theoretical values for 9α-benzoxydehydroabietyl benzoate.

Ten parts of the above dibenzoate was refluxed in 40 parts of collidine for about 40 hours. The major portion of the collidine was then removed by distillation. The remaining solution was dissolved in ether and the ethereal solution was washed with a 10% aqueous solution of hydrochloric acid, then with water, and finally was dried and the ether removed from it. The oily residue which remained was crystallized from ethanol to obtain 6.3 parts (76% of theory) of a product melting at 96°–97° C. The ultraviolet spectrum was that in agreement for a compound having an ethylene double bond in the 9(10)-position. The carbon and hydrogen analysis was also in agreement with that for 9(10)-dehydro-dehydroabietyl benzoate, which may also be named the benzoic acid ester of 1,2,3,4,4a,10a-hexahydro-1-hydroxymethyl-7-isopropyl-1,4a-dimethyl-phenanthrene.

To a solution of 8.5 parts of the above 9(10)-dehydrodehydroabietyl benzoates in 200 parts of ethanol was added a solution of 1.74 parts of sodium hydroxide in 15 parts of water. This reaction mixture was refluxed under nitrogen for 22 hours, after which the solvent was removed under reduced pressure. The residue was shaken with a mixture of ether and water and the ethereal layer was separated, washed with water, and dried. On removal of the ether there was obtained 6.1 parts of 9(10)-dehydrodehydroabietyl alcohol. It was an oil which could not be crystallized.

The new compounds of this invention, containing an ethylene double bond in the 9(10)-position of the dehydroabietic acid nucleus, are most readily prepared from the 9-hydroxydehydroabietic compound, i. e., 9-hydroxydehydroabietic acid or esters thereof or 9-hydroxydehydroabietyl alcohol or the esters or the ethers thereof. The 9-hydroxy compounds from which the dehydrodehydroabietic compounds are prepared exist in two epimeric forms. In one, known as the α-epimeride, the hydroxy group has a transconfiguration with reference to the methyl group in the 4a-position, and in the other, known as the β-epimeride, the hydroxy group has a cis configuration with reference to the 4a-methyl group. The 9α-compounds are more stable than the 9β-compounds and hence the latter epimerides are generally used to prepare the dehydrodehydroabietic compounds of this invention.

The esters of 9β-hydroxydehydroabietic acid are prepared by the hydrogenation in neutral solution of the corresponding ester of 9-oxodehydroabietic acid. When the latter esters are hydrogenated in neutral solution, as, for example, in ethanol over a noble metal catalyst such as palladium-on-carbon, the product consists of a single epimer, namely, the β-epimer. Hence, this method of preparing the esters of 9β-hydroxydehydroabietate is preferred.

The esters of 9(10)-dehydro-dehydroabietic acid may then be prepared from the esters of the 9β-hydroxydehydroabietic acid in two ways as illustrated by the foregoing examples. The 9β-hydroxydehydroabietate may be converted to the pyridinium p-toluenesulfonate which when heated yields the 9(10)-dehydrodehydroabietate, or it may be acylated to form the 9-acyloxy compound which when boiled with a base such as collidine or pyridine splits out the acyl acid and yields the 9(10)-dehydrodehydroabietate.

The esters of dehydroabietic acid-9α-pyridinium p-toluenesulfonate may be prepared by treating a solution of an ester of 9β-hydroxydehydroabietic acid in pyridine with p-toluenesulfonyl chloride. This reaction is generally carried out at temperatures of from about −25° C. to about 30° C. The dehydro-dehydroabietate is then prepared by heating this intermediate to a temperature of from about 150° C. to about 300° C.

The esters of 9-acyloxydehydroabietic acid are readily obtained from the esters of 9-hydroxydehydroabietic acid by reaction of the latter compound with an acyl chloride, as, for example, acetyl chloride, benzoyl chloride, etc. This acylation reaction is generally carried out at a temperature of from about 0° C. to about 90° C. The dehydro-dehydroabietate is then obtained from the 9-acyloxy compound by heating it at a temperature of from about 50° C. to about 200° C. with a base to deacylate it. For example, the 9-acetoxydehydroabietate may be deacetylated by heating it with pyridine, collidine, etc. In the same way, the 9-benzoxydehydroabietate may be heated with collidine or pyridine to remove benzoic acid and then obtain the 9(10)-dehydrodehydroabietate.

The esters of 9(10)-dehydro-dehydroabietic acid may also be prepared by brominating an ester of dehydroabietic acid with a brominating agent such as N-bromosuccinimide, whereby the ester of 9-bromodehydroabietic acid is obtained, which when heated with a base such as collidine or pyridine, etc., will split out hydrogen bromide to produce the ester of 9(10)-dehydro-dehydroabietate.

The 9(10)-dehydro-dehydroabietyl alcohol derivatives are most readily prepared from 9-hydroxydehydroabietyl alcohol via the intermediate acylate. The 9-hydroxydehydroabietyl alcohol is readily obtained by reduction of an alkyl 9-oxodehydroabietate, as, for example, methyl 9-oxodehydroabietate, with lithium aluminum hydride. This reaction is carried out by contacting an anhydrous solution of the alkyl 9-oxodehydroabietate in an inert solvent such as ether, dioxane, etc., with the lithium aluminum hydride at a temperature of from about 0° C. to about 80° C. and then hydrolyzing the intermediate complex by the addition of water, a dilute solution of a mineral acid, or a dilute alkali solution. The 9-hydroxydehydroabietyl alcohol so obtained may then be acylated by means of an acyl halide such as acetyl chloride, benzoyl chloride, etc. The latter reaction may be carried out by heating the diol with the acyl halide in an inert solvent at a temperature of from about 0° C. to about 90° C. The 9(10)-dehydro-dehydroabietyl acylate may then be obtained by heating the diacylate with a reagent such as collidine, pyridine, etc., at a temperature of from about 50° C. to about 200° C. The free alcohol, 9(10)-dehydro-dehydroabietyl alcohol, is then obtained by hydrolysis of the acylate group.

The 9(10)-dehydro derivatives of dehydroabietic acid having a substituent other than isopropyl in the 7-position, as, for example, a hydroxy radical, acetyl radical, etc., are prepared by the same series of reactions as described above for the preparation of the 9(10)-dehydro-dehydroabietic acid and the 9(10)-dehydro-dehydroabietyl alcohol from an alkyl 9-oxodehydroabietate. In these cases the starting material will be the ester of the acid having said substituent in the 7-position and an oxo group in the 9-position, as, for example, an ester of 1,2,3,4,4a,9,10,10a-octahydro-7-hydroxy-1,4a-dimethyl-9-oxo-1-phenanthrenecarboxylic acid, an ester of 7-acetyl-1,2,3,4,4a,9,10,10a-octahydro-1,4a-dimethyl-9-oxo-1 - phenanthrenecarboxylic acid, etc. The 9(10)-dehydro derivatives having an isopropenyl group in the 7-position are readily prepared by bromination of the 9-acyloxydehydroabietyl alcohol or a 9-acyloxydehydroabietic acid ester and then dehydrobrominating and dehydroacylating the said alcohol or ester. They may also be prepared by dehydrobromination of the 9,14-dibromodehydroabietyl alcohol or ester of 9,14-dibromodehydroabietic acid, the latter compounds being prepared by brominating the alcohol or ester with an N-bromoimide.

The new 9(10)-dehydro-dehydroabietic acid and derivatives thereof in accordance with this invention are valuable derivatives in the preparation of other resin acid derivatives. The 9(10)-double bond is a functional group entirely new to the resin acids and hence makes possible the introduction of other functional groups in the 9- and 10-positions. For example, a hydroxyl radical may be introduced in the 10-position by treatment of 9(10)-dehydro-dehydroabietic acid or its esters with a peroxygenated acid followed by reaction with hydrogen chloride and Raney nickel to produce the entirely new acid 10-hydroxydehydroabietic acid or its esters, or two alcohol groups may be introduced by treatment of the dehydro derivative with hydrogen peroxide and sodium hydroxide to produce the new 9,10-dihydroxydehydroabietic acid and its esters. In the same way, di- and tri-ols may be produced from 9(10)-dehydro-dehydroabietyl alcohol, etc. As will be readily apparent, a wide variety of other compounds may be produced from the new 9(10)-dehydro-dehydroabietic acid derivatives of this invention. The esters of 9(10)-dehydro-dehydroabietic acid and the 9(10)-dehydro-dehydroabietyl alcohol and esters thereof may be used as plasticizers for cellulose ethers and esters, etc. They may also be used in adhesive compositions.

What I claim and desire to protect by Letters Patent is:

1. As a new composition of matter, a compound having the formula

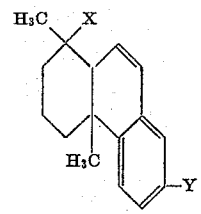

where X is selected from the group consisting of methylol, acyloxymethyl, carboxy, and carboalkoxy and Y is selected from the group consisting of isopropyl, isopropenyl, hydroxyl, and acetyl, where acyl is the acyl radical of a carboxylic acid.

2. 9(10)-dehydro-dehydroabietic acid.
3. An alkyl ester of 9(10)-dehydro-dehydroabietic acid.
4. 9(10)-dehydro-dehydroabietyl alcohol.
5. A carboxylic acid ester of 9(10)-dehydro-dehydroabietyl alcohol.

6. Methyl ester of 9(10)-dehydro-dehydroabietic acid.
7. 9(10)-dehydro-dehydroabietyl benzoate.
8. The process of preparing a 9(10)-dehydro-dehydroabietic acid derivative which comprises heating a compound having the formula

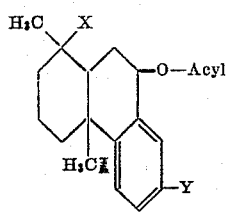

where X is selected from the group consisting of methylol, acyloxymethyl, carboxy, and carboalkoxy and Y is selected from the group consisting of isopropyl, isopropenyl, hydroxyl, and acetyl with a dehydroacylating agent selected from the group consisting of collidine, pyridine, and dimethylaniline at a temperature of from about 50° C. to about 200° C., where acyl is the acyl radical of a carboxylic acid.

No references cited.